(12) United States Patent
Eppich

(10) Patent No.: US 6,425,753 B1
(45) Date of Patent: Jul. 30, 2002

(54) INJECTION UNIT FOR AN INJECTION MOLDING MACHINE

(75) Inventor: Stefan Eppich, Arbing (AT)

(73) Assignee: Engel Maschinenbau Gesellschaft m.b.H., Schwertberg (AT)

(*) Notice: Subject to any disclaimer, the term of this patent is extended or adjusted under 35 U.S.C. 154(b) by 0 days.

(21) Appl. No.: 09/452,843

(22) Filed: Dec. 3, 1999

(30) Foreign Application Priority Data

Dec. 7, 1998 (AT) ............................................ 2046/98

(51) Int. Cl.$^7$ ............................................ B29C 45/50
(52) U.S. Cl. ...................................... 425/574; 425/583
(58) Field of Search .............................. 425/145, 574, 425/583

(56) References Cited

U.S. PATENT DOCUMENTS

| | | | | |
|---|---|---|---|---|
| 3,890,308 A | * | 6/1975 | Collins | 425/242 R |
| 4,144,012 A | * | 3/1979 | Pinkley | 425/225 |
| 4,222,725 A | * | 9/1980 | Rodgers, Jr. | 425/145 |
| 4,879,077 A | * | 11/1989 | Shimizu et al. | 264/40.1 |
| 5,348,463 A | * | 9/1994 | Keitel et al. | 425/145 |
| 5,482,452 A | * | 1/1996 | Hehl | 425/145 |
| 5,916,602 A | * | 6/1999 | Klaus | 425/145 |
| 6,015,284 A | | 12/2000 | Eppich et al. | |

FOREIGN PATENT DOCUMENTS

| | | |
|---|---|---|
| DE | 19702888 | 7/1997 |
| EP | 0870590 | 10/1998 |
| JP | 4053719 | 2/1992 |

\* cited by examiner

*Primary Examiner*—Nam Nguyen
*Assistant Examiner*—Joseph S Del Sole
(74) *Attorney, Agent, or Firm*—Notaro & Michalos P.C.

(57) ABSTRACT

An injection unit for an injection molding machine has a plasticising cylinder and a plasticising screw arranged axially displaceably therein. The plasticising cylinder is fixedly connected to a housing which, at two mutually opposite walls, carries a respective crank drive extending parallel to the wall for displacement of the plasticising screw. A motor for driving the crank drive is internally fixed to the wall and the axis of rotation of the motor extends normal to the crank drive.

3 Claims, 5 Drawing Sheets

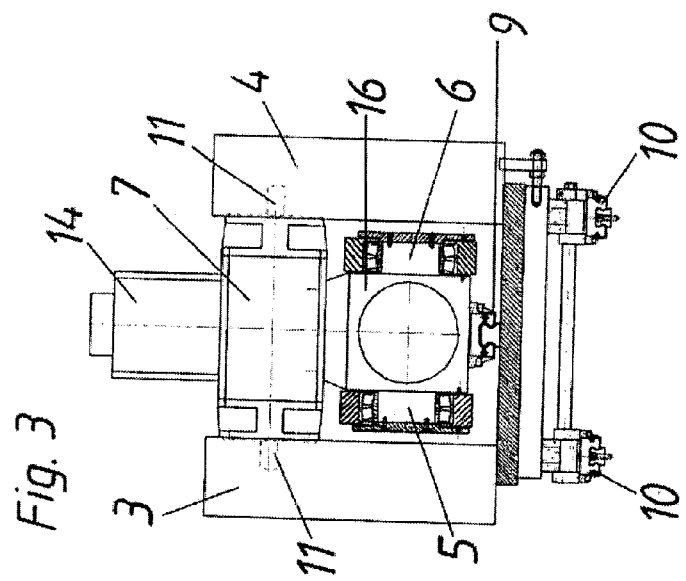
Fig. 3
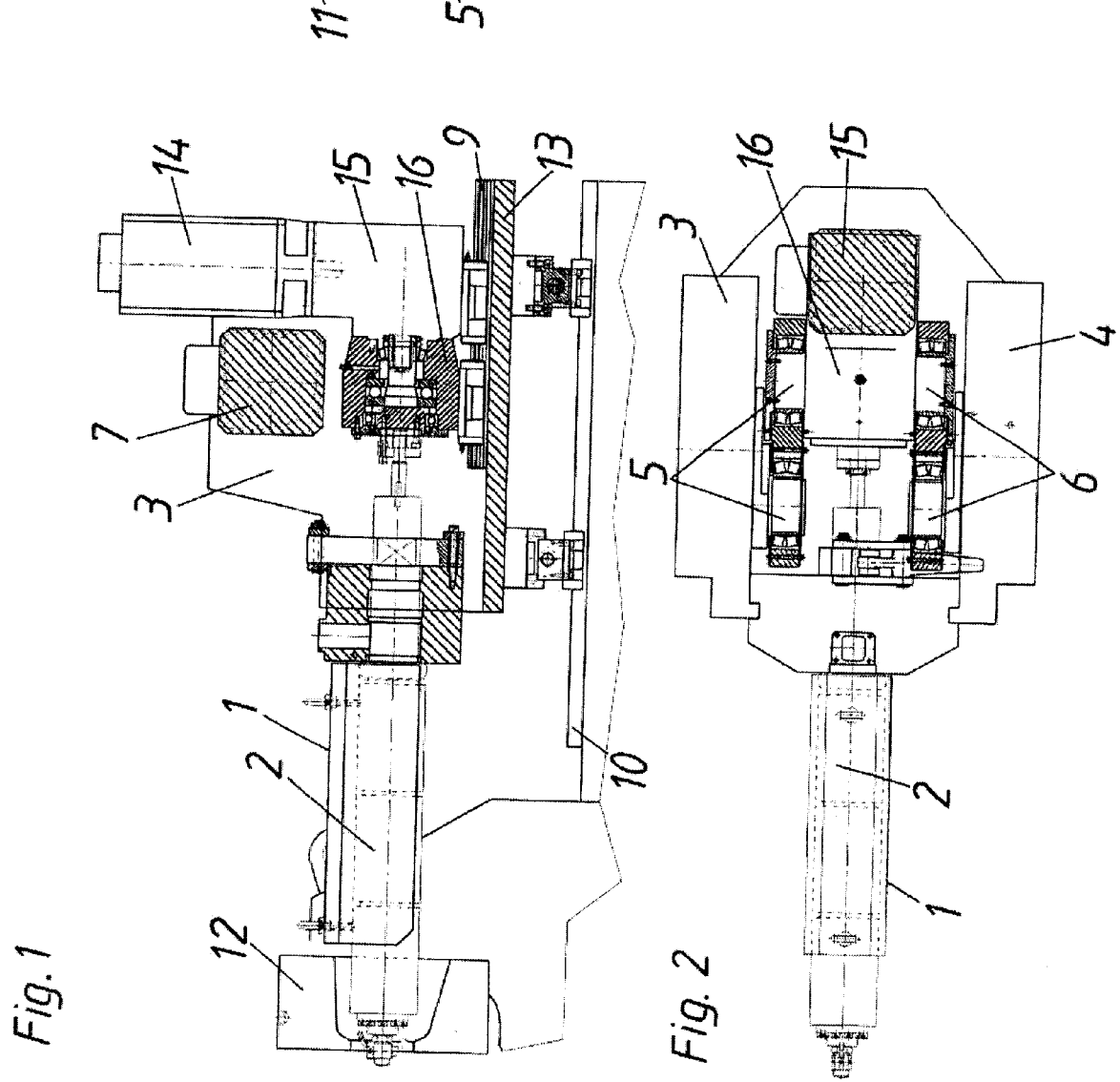
Fig. 1
Fig. 2

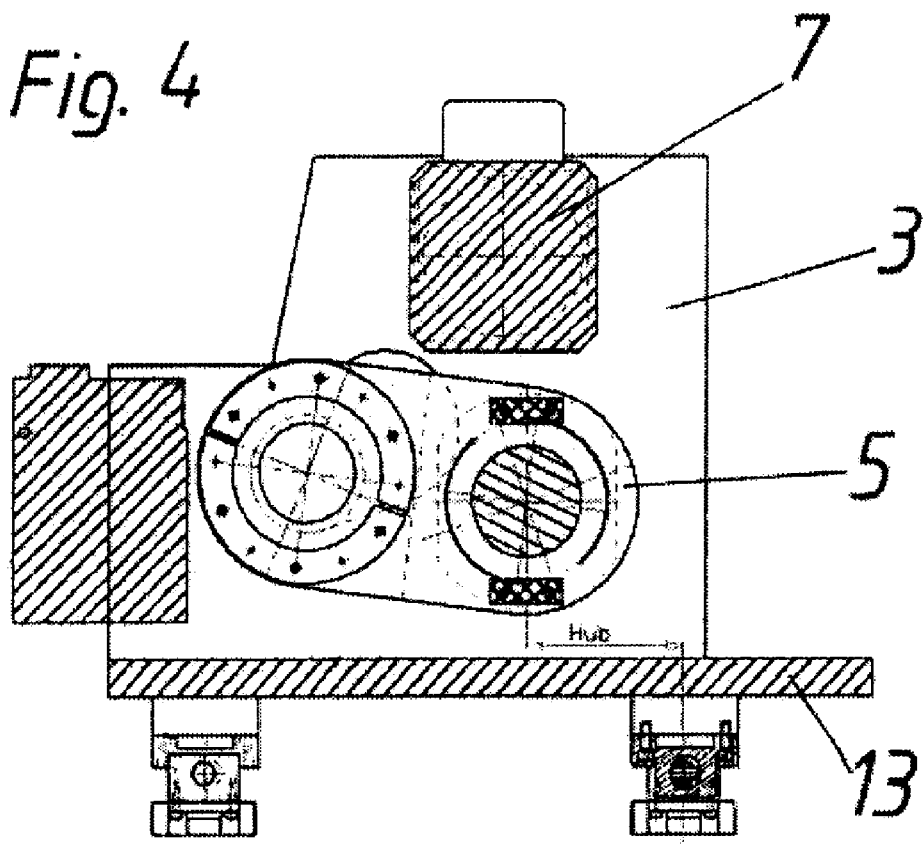
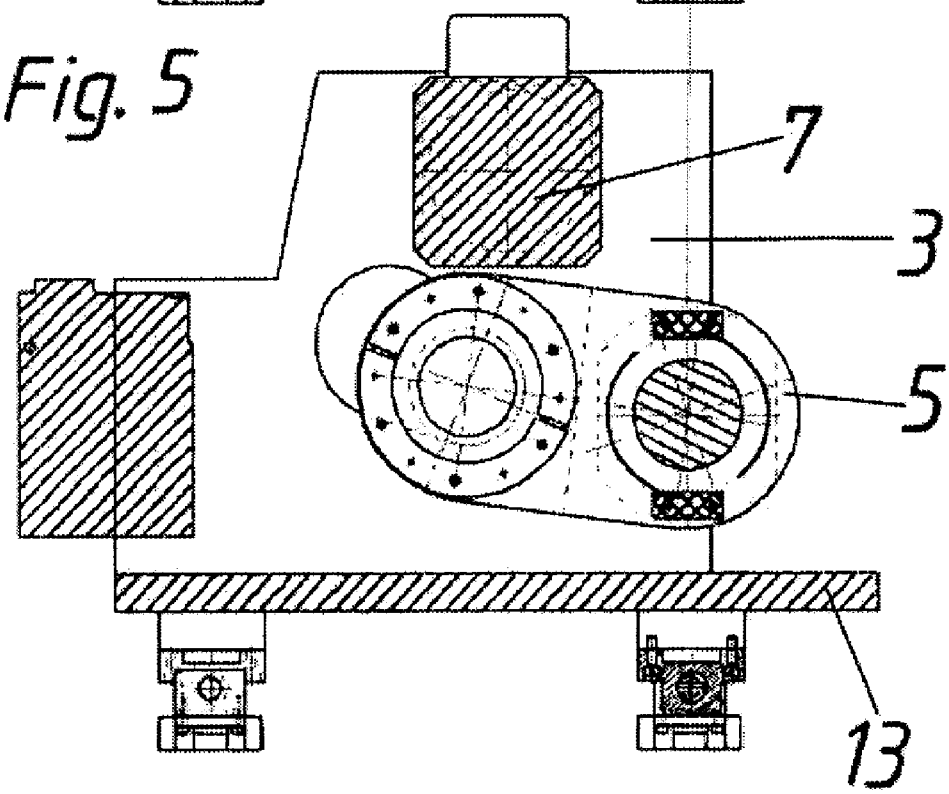

INJECTION UNIT FOR AN INJECTION MOLDING MACHINE

FIELD AND BACKGROUND OF THE INVENTION

The invention relates to an injection unit for an injection molding machine having a plasticising cylinder and a plasticising screw which is axially displaceably arranged therein, wherein the plasticising cylinder is fixedly connected to a housing which at two oppositely disposed walls carries a respective crank drive extending parallel to the wall for displacement of the plasticising screw, the crank drive being driven by a rotating motor mounted to the same wall.

In the known apparatuses of that kind, the motors for actuation of the crank drives are disposed outside the housing in which the crank drives are arranged. In order to save space, in that case (see EP 0 870 590 A2) the motors can be arranged in the direction of the axis of the machine. That however gives rise to the necessity to provide an expensive angle transmission between the motor and the crank drive.

SUMMARY OF THE INVENTION

In comparison therewith, the object of the present invention is to provide an arrangement which combines a low level of space requirement with a low level of structural complication and expenditure. In accordance with the invention that object is attained in that the motor is internally fixed to at least one of the walls and the axis of rotation of the motor extends normal to the crank drive.

Preferably, in such an apparatus, the crank drives will be arranged at the side walls of the housing and it will be provided that the crank drives extend vertically and that the motor extends above the plasticising screw in transverse relationship therewith. That makes it possible for the end of the plasticising screw to be supported in a vertical direction on a guide rail which is fixed with respect to the housing.

The most compact configuration for the apparatus according to the invention is achieved if there is provided at least one motor which has at both ends drive shafts which are mounted at mutually opposite walls of the housing. As the prices of the servo motors which can be used in accordance with the invention rise overproportionally with increasing power output, it may be desirable in that respect to arrange two such motors in mutually superposed relationship.

BRIEF DESCRIPTION OF THE DRAWINGS

Further details of the invention will be described hereinafter with reference to the drawing in which:

FIGS. 1 through 5 show a first embodiment; wherein

FIG. 1 is a vertical section through the longitudinal center line;

FIG. 2 is a horizontal section through the longitudinal center line;

FIG. 3 is a front view (for the sake of enhanced clarity of the drawing, the crank drives have been omitted from FIG. 1 and the transmissions disposed between the motor and the crank drives have been omitted from FIGS. 1 and 2);

FIGS. 4 and 5 are each a section taken at crank drives in FIG. 1, corresponding to various crank positions;

DESCRIPTION OF THE PREFERRED EMBODIMENTS

Figure 7:
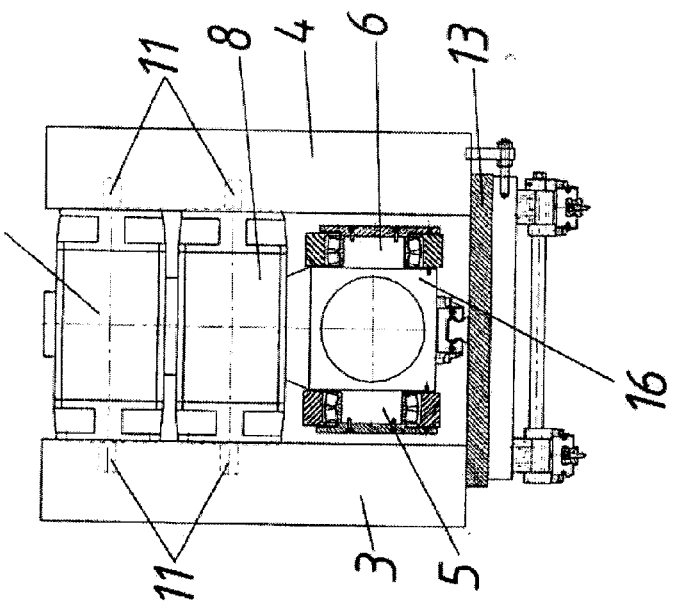
FIGS. 6 through 9 correspond to a second embodiment to FIGS. 1 and 3 through 5, wherein the sectional plane for FIGS. 8 and 9 is displaced outwardly by the crank thickness.
Figure 6:
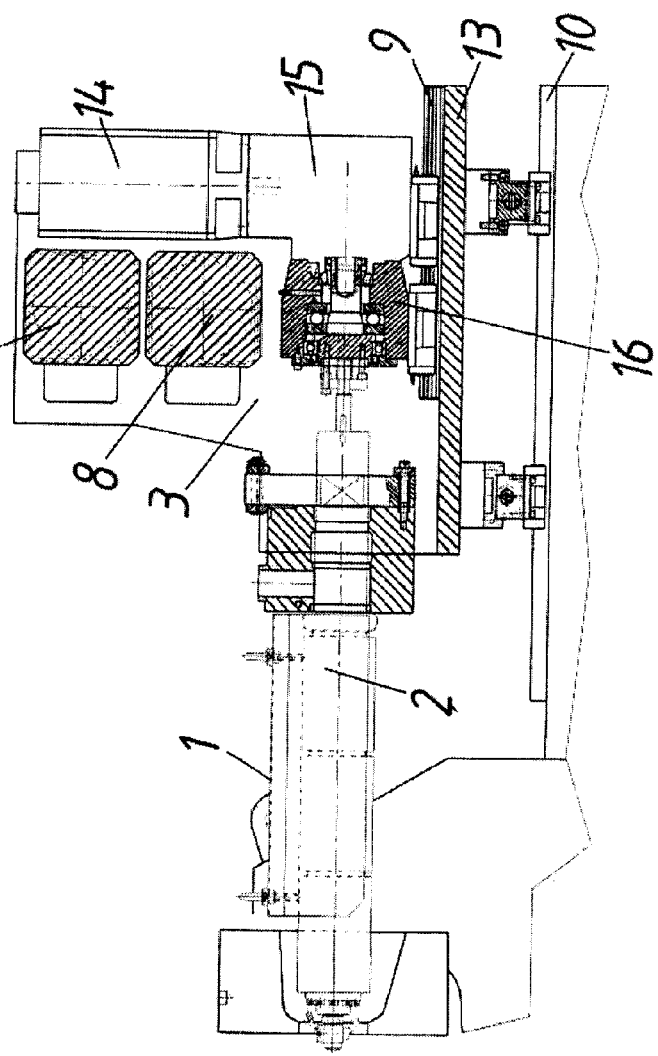

The embodiment of FIGS. 1 through 3 shows the injection unit of an injection molding machine. The purpose of such injection units is to put into a condition such that it is capable of flow granular plastic material which is fed by means of the plasticising screw 2 supported in the plasticising cylinder 1, and to press the granular plastic material through the stationary mold mounting plate 12 into the injection mold (not shown). The entire unit is displaceable on rails 10 in order to be able to vary the spacing relative to the mold mounting plate 12.

During the plasticising procedure, the plasticising screw 2 whose end is mounted in a housing 16 is caused to rotate by the motor 14 by way of an angle transmission 15. In that situation, it moves together with the motor 14, the angle transmission 15 and the housing 16 towards the right in FIG. 1. For that purpose, rails 9 are provided at the bottom 13 of a housing comprising said bottom 13 and the side walls 3 and 4.

In the injection procedure, the plasticising screw is used like a hydraulic piston and for that purpose is displaced toward the left in FIG. 1 on the rails 9. For carrying out that movement, the assembly has the motor 7 or 8 which bridges over the housing 16 and which has drive shafts 11 at both ends. They each act on a respective transmission which is arranged in the respective walls 3 and 4 and which actuates the crank drives 5 and 6 which engage the housing 16. FIGS. 4 and 5 show the crank drive 5 in two positions, the transition from FIG. 5 to FIG. 4 corresponding to the injection procedure.

The embodiment of FIGS. 6 through 9 differs from the first embodiment by virtue of the arrangement of a second motor 8. The advantage of using two motors 7 and 8 which are arranged in parallel relationship and which act on the same transmissions is in particular a saving in cost. More specifically, the price of servo motors rises overproportionally, with increasing power output.

Figure 8:
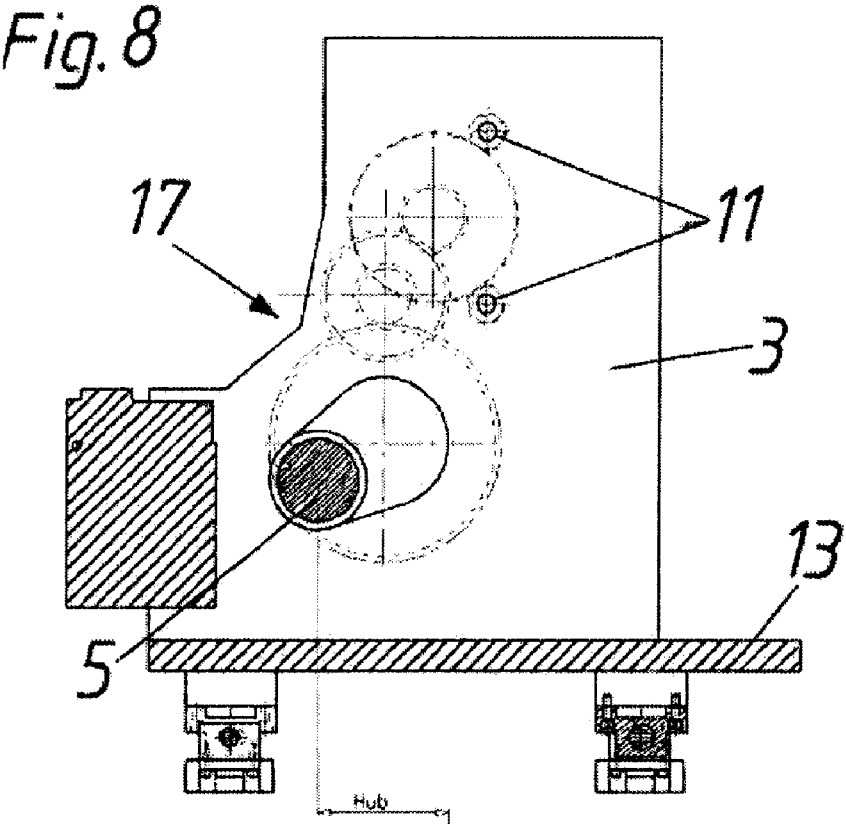
Figure 9:
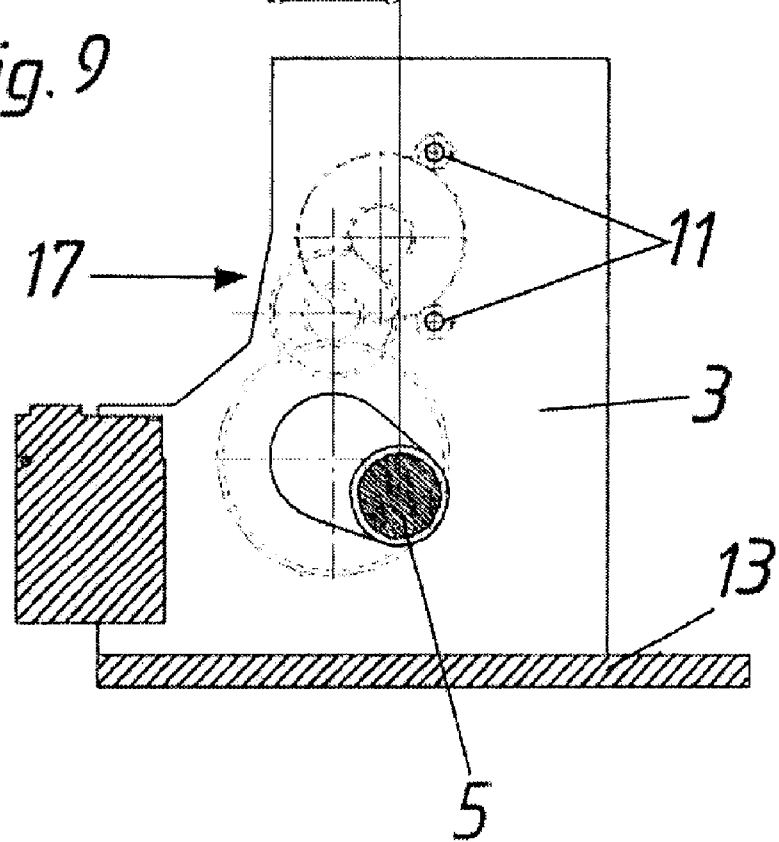

FIGS. 8 and 9 indicate the transmission 17 which is arranged in the wall 3 and on which the motors 7 and 8 act by way of the drive shafts 11, in order thereby to actuate the cranks 5.

Figure 10:
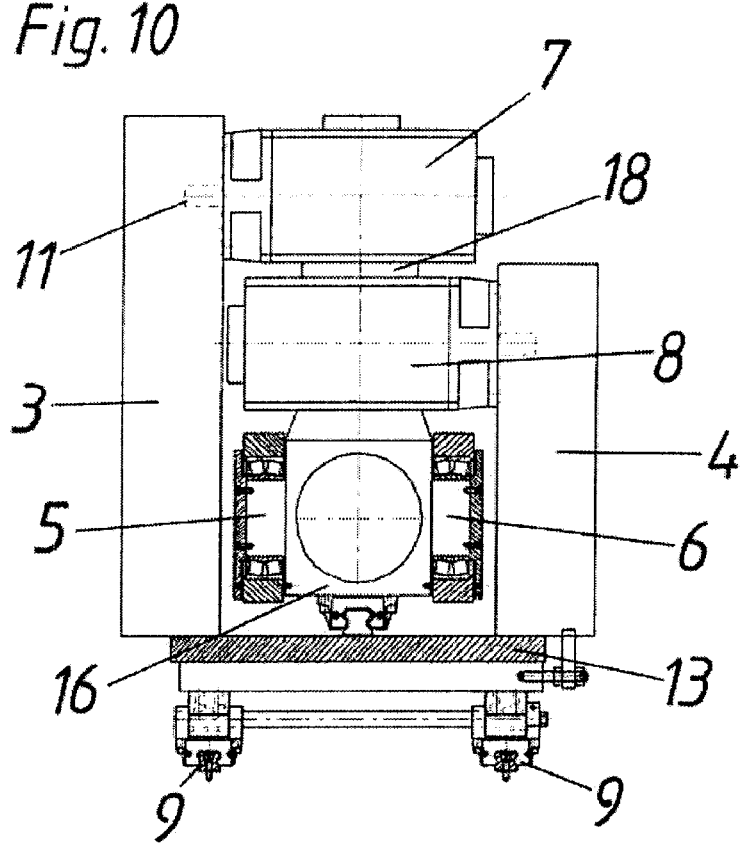
FIGS. 10 and 11 are front views of two further embodiments.
Figure 11:
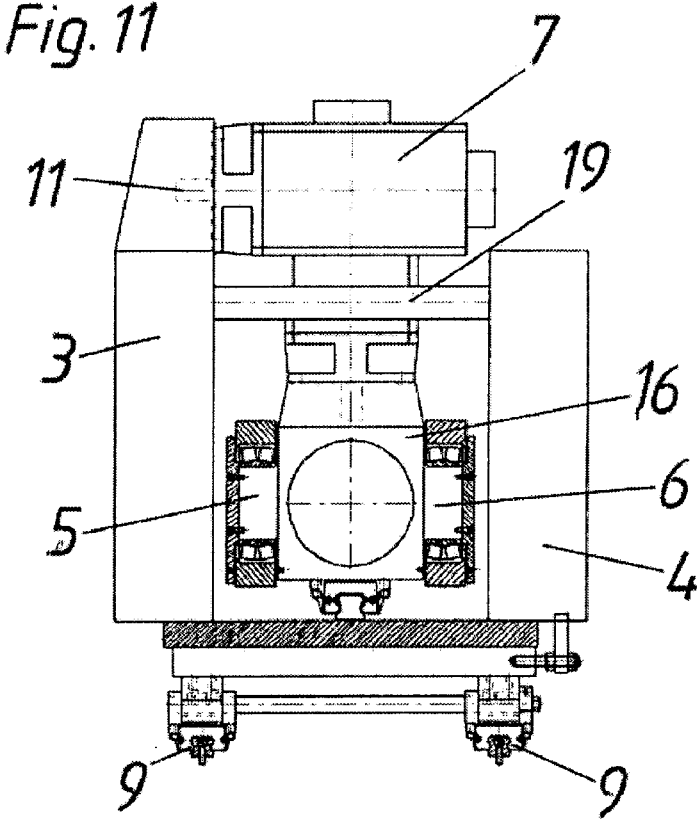

In the first two embodiments, each motor 7, 8 drives both cranks 5, 6. It is also possible in accordance with the invention however for each motor to be connected only to one of the two cranks, if the motors are synchronised. FIGS. 10 and 11 show two embodiments of that kind, omitting the transmissions which are disposed in the walls 3 and 4.

In the embodiment shown in FIG. 10, the motor 7 drives the cranks 5 while the motor 8 drives the cranks 6. Synchronisation of the motors 7 and 8 is effected by a so-called synchro-tie or autosyn 18.

The embodiment shown in FIG. 11 has only one motor 7 which is fixed to the inside of the wall 3. It drives the crank drive 5 by way of a transmission arranged in the wall 3, but it drives the crank drive 6 by way of the shaft 19 and a transmission provided in the wall 4.

What is claimed is:

1. An injection unit for an injection molding machine comprising:

a plasticising cylinder and a plasticising screw which is axially displaceably arranged in the plasticising cylinder;

the plasticising cylinder being fixedly connected to a housing having two oppositely disposed walls, each carrying a respective crank drive extending in a direction which is substantially parallel to the walls for displacement of the plasticising screws;

the crank drive being driven by a rotating motor mounted to at least one of the two oppositely disposed walls;

the motor extending between the walls and being fixed to at least one of the walls; and an axis of rotation of the motor extending normal to the direction of extension of the crank drive.

2. An injection unit as set forth in claim 1, wherein the crank drives extend vertically and the axis of rotation of the motor extends above the plasticising screw in traverse relationship with an axis of rotation of the plasticising screw.

3. An injection unit as set forth in claim 1, wherein the motor has opposite ends with drive shafts mounted at the oppositely disposed walls of the housing.

* * * * *